United States Patent
Brillon et al.

(10) Patent No.: US 10,640,088 B2
(45) Date of Patent: May 5, 2020

(54) METHOD FOR TEMPORARILY INHIBITING REMOTE ACTIVATION OF A FUNCTION PRESENT IN A MOTOR VEHICLE

(71) Applicants: Continental Automotive France, Toulouse (FR); Continental Automotive GmbH, Hannover (DE)

(72) Inventors: Alain Brillon, Villeneuve Tolosane (FR); Stéphane Charbonnier, Labarthe sur Leze (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/481,880

(22) PCT Filed: Mar. 27, 2018

(86) PCT No.: PCT/FR2018/050742
§ 371 (c)(1),
(2) Date: Jul. 30, 2019

(87) PCT Pub. No.: WO2018/185397
PCT Pub. Date: Oct. 11, 2018

(65) Prior Publication Data
US 2019/0389427 A1    Dec. 26, 2019

(30) Foreign Application Priority Data
Apr. 4, 2017   (FR) ...................................... 17 52899

(51) Int. Cl.
*B60R 25/24*    (2013.01)
*B60R 25/20*    (2013.01)

(52) U.S. Cl.
CPC .......... *B60R 25/245* (2013.01); *B60R 25/209* (2013.01)

(58) Field of Classification Search
CPC ................................... B60R 25/24; G07C 9/00
See application file for complete search history.

(56) References Cited

U.S. PATENT DOCUMENTS

| 6,255,944 | B1 | 7/2001 | Addy |
| 6,700,476 | B1 * | 3/2004 | Okada ..................... B60R 25/04 340/12.51 |

(Continued)

FOREIGN PATENT DOCUMENTS

| EP | 1046558 A1 | 10/2000 |
| FR | 2852048 A1 | 9/2004 |

(Continued)

OTHER PUBLICATIONS

International Search Report and Written Opinion for International Application No. PCT/FR2018/050742, dated Jul. 5, 2018—8 pages.

(Continued)

*Primary Examiner* — Nabil H Syed
(74) *Attorney, Agent, or Firm* — RatnerPrestia

(57) ABSTRACT

A method for temporarily inhibiting remote activation of a function present in a motor vehicle, the activation taking place between an activation device carried by a person authorized to perform this activation and an activation module present in the vehicle through the transmission, reception and measurement of electromagnetic waves between the activation device and the activation module, the inhibition taking place after a predetermined number of activation attempts that are unsuccessful as they are considered to be located outside of a detection zone. The respective mathematical positions of the unsuccessful activation attempts are stored, and only activation attempts whose position differs by a certain threshold from at least one position of an already stored unsuccessful activation attempt are taken into account as unsuccessful activation attempts.

13 Claims, 1 Drawing Sheet

(56) References Cited

U.S. PATENT DOCUMENTS

| | | |
|---|---|---|
| 2004/0178883 A1 | 9/2004 | Haselsteiner et al. |
| 2007/0191998 A1 | 8/2007 | Arie et al. |
| 2011/0102139 A1 | 5/2011 | Girard et al. |
| 2012/0229254 A1* | 9/2012 | Nowottnick ....... G07C 9/00309 340/5.61 |
| 2015/0248801 A1 | 9/2015 | Froitzheim et al. |

FOREIGN PATENT DOCUMENTS

| | | |
|---|---|---|
| FR | 3020027 A1 | 10/2015 |
| WO | 2014044524 A1 | 3/2014 |

OTHER PUBLICATIONS

English Translation of the Written Opinion for International Application No. PCT/FR2018/050742, dated Jul. 5, 2018, 6 pages.

\* cited by examiner

METHOD FOR TEMPORARILY INHIBITING REMOTE ACTIVATION OF A FUNCTION PRESENT IN A MOTOR VEHICLE

CROSS REFERENCE TO RELATED APPLICATIONS

This application is the U.S. National Phase Application of PCT International Application No. PCT/FR2018/050742, filed Mar. 27, 2018, which claims priority to French Patent Application No. 1752899, filed Apr. 4, 2017, the contents of such applications being incorporated by reference herein.

FIELD OF THE INVENTION

The present invention relates to a method for temporarily inhibiting remote activation of a function present in a motor vehicle.

More precisely, in this inhibition method, the activation takes place between an activation means carried by a person authorized to perform this activation and an activation module present in the vehicle through the transmission, reception and measurement of electromagnetic waves between the activation means and the activation module. The activation module is able to recognize the activation means, to determine a mathematical position in an electromagnetic field space of the activation means situated in a predetermined detection zone, and to authorize the activation in this case.

In the method, the activation is inhibited after a predetermined number of activation attempts that are unsuccessful as they are considered to be located outside of a detection zone and probably malicious.

The method according to an aspect of the present invention makes it possible to distinguish, among unsuccessful attempts assumed to be malicious, activation attempts that are unsuccessful but that are not malicious as they are performed by an authorized person. These unsuccessful activation attempts are primarily due to errors in the detection of the activation means, in the possession of the authorized person, by the activation module present in the vehicle.

BACKGROUND OF THE INVENTION

Methods for the remote activation of a function present in a motor vehicle are known. These methods are known under the name of a "hands-free" method for accessing the vehicle and/or starting the vehicle. In such methods, the person authorized to perform the activation, often the driver of the vehicle, possesses an electronic key or an electronic fob as activation means for performing unlocking or locking of the opening elements and/or making it possible to start the vehicle corresponding thereto with an activation module in the manner described above.

It is possible for the authorized person to carry the electronic key or fob on himself or leave it in a bag that he carries to perform these actions. Such systems for implementing such what are known as "hands-free" unlocking methods are called for example passive access and start engine systems, and grouped together under the term PASE. These "hands-free" systems are particularly advantageous because the authorized person does not need to hold his key or his fob in his hand while pointing it for example at the vehicle.

For a passive access and engine start system, a method of attack, called a relay attack, has been developed by criminals who are not authorized to activate a function present in the vehicle. Such a method of attack makes it possible, for example in order to perform starting, to convince the activation module that the activation means is located inside the vehicle, whereas the apparatus simulating the activation means and the criminal manipulating it are outside the vehicle.

The solutions that are currently implemented against a relay attack do not make it possible to guarantee 100% protection against malicious activation. It has therefore been proposed to temporarily suspend the activation of the requested function after a certain number of unsuccessful activation attempts. This makes it possible to discourage criminals from attacking the system by not allowing them to continue the relay attack.

By contrast, such a solution of suspending the activation has the disadvantage of locking the activation for activation attempts that are unsuccessful even though they do not have any malicious nature as they are performed by an authorized person. This is the case when the activation means is not recognized by the activation module as it is outside of a detection zone or when the transmission between activation means and activation module is subject to interference from electronic apparatuses external to the activation system, for example but not exclusively from mobile telephones situated close to the vehicle.

In the case of use of the activation means that is authorized but leads to an unsuccessful activation attempt, the authorized person, not understanding why his activation means is not working, will tend to repeat his start requests while still holding his activation means in his hand. It is possible that this takes the activation means out of a zone of non-detection, but it may also be the case that this does not change anything with regard to the lack of detection and that the authorized person then himself locks the activation by performing too many unsuccessful activation attempts and exceeding a maximum number of unsuccessful activation attempts that is predetermined for the security of the activation method.

SUMMARY OF THE INVENTION

The problem underlying the present invention is that of designing a method for inhibiting remote activation of a function present in a motor vehicle through an exchange between an activation means carried by a person and an activation module integrated into the motor vehicle, which method is more precisely able to take into account malicious unsuccessful activation attempts while avoiding inappropriate inhibition of the activation for activation attempts that are unsuccessful due to causes other than malicious actions.

To this end, one aspect of the present invention is a method for temporarily inhibiting remote activation of a function present in a motor vehicle, the activation taking place between an activation means carried by a person authorized to perform this activation and an activation module present in the vehicle through the transmission, reception and measurement of electromagnetic waves between the activation means and the activation module, the activation module being able to recognize the activation means, to determine a mathematical position in an electromagnetic field space of the activation means for a detection zone and to authorize the activation in this case, the activation being inhibited after a predetermined number of activation attempts that are unsuccessful as they are considered to be located outside of a detection zone, noteworthy in that the respective mathematical positions of the unsuccessful activation attempts are stored and that only activation attempts whose position differs by a certain threshold from at least one position of an already stored unsuccessful activation attempt are taken into account as unsuccessful activation attempts.

The solution proposed by an aspect of the present invention aims to store the positions of the one or more activation means and to increment the unsuccessful activation attempts that lead to inhibition of the activation of the function present in the vehicle only if the mathematical positions of these activation attempts change with respect to the already stored activation attempts.

An aspect of the present invention makes it possible to distinguish with certainty unsuccessful activation attempts made by an authorized person and which have no reason to be considered to be malicious attempts, in contrast to other unsuccessful activation attempts.

In the case of normal use, the person authorized to activate the function present in the vehicle will persist with his request to activate the function as far as looking for the activation means that he is carrying, advantageously in the form of a fob, taking it out, holding it in his hand and moving it while keeping the same position.

In a first possible case, the activation means will thus leave a possible zone of non-detection: the following start request will thus be positive. In the opposite case, when the activation means remains in a zone of non-detection, this being due for example to external electromagnetic interference, as the authorized person will have moved the activation means while staying in place, the activation means remains in a position close to the position that it occupied previously, more precisely in surroundings within arm's reach of the position that it occupied.

This makes it possible to distinguish an unsuccessful activation attempt made by an authorized person from an activation attempt made maliciously. Specifically, in the latter case, the criminal will move with an apparatus similar to an activation means in order to find a detection zone that may lead to activation of the system.

This means that a position of an unsuccessful activation attempt that differs only slightly from a position of a previously stored activation attempt, that is to say below a maximum distance threshold from the stored position, is certainly associated with an attempt made by an authorized person and should therefore not be counted in the intrusive activation attempts.

Removing a certain activation attempt from the list of unsuccessful activation attempts that are mostly malicious makes it possible not to increase this list and not to cause inappropriate inhibition of the activation. This is not at all to the detriment of the security of the inhibition method.

By contrast, removing such activation attempts, performed by an authorized person and falsely detected as intrusive by the prior art, makes it possible not to incorrectly block the inhibition. This is all the more true as the authorized person, not understanding why his activation means is not working, will make numerous activation requests in succession, which would quickly lead to inhibition, unexpectedly blocking the activation in a method according to the prior art.

The maximum distance threshold corresponds to a movement of the activation means for a position of the authorized person that remains the same and due to movement of an arm of the person, that is to say that the activation means remains within the reach of the person and therefore his initial position.

Advantageously, the activation module is associated with at least one antenna for transmitting and receiving electromagnetic waves and that is situated on or in the motor vehicle.

Advantageously, when the activation module is associated with a plurality of antennas, the antennas are positioned at various locations of the vehicle, the antennas or groups of antennas transmitting electromagnetic waves alternately. The entire surroundings of the vehicle are then covered by the antennas, providing a sufficient detection zone for detection of the activation means by the activation module.

Advantageously, each mathematical position of the activation means is determined by at least one received signal strength indication, received by the antenna or each antenna, of an electromagnetic wave returning from the activation means. Specifically, the physical position of the activation means is unknown, and only its electromagnetic position equivalent to a mathematical position is known.

Advantageously, each received signal strength indication, received from an electromagnetic wave returning from the activation means, undergoes processing so as to reduce amplitude dynamics on the basis of the distance from the activation means to the antenna or to each antenna. This could distort the comparison between the mathematical coordinates of a new unsuccessful activation attempt position with one or more positions of the activation attempts already stored as being unsuccessful.

Advantageously, the stored unsuccessful attempts to remotely activate the vehicle are grouped into at least one software memory (or a memory directory) integrated into the activation module, the antenna or each antenna having a respective software memory. The coordinates reflecting signal strength indications of the electromagnetic waves from the various stored positions of the activation means in the electromagnetic space are thus grouped for each antenna.

Advantageously, for a new unsuccessful activation attempt, the position of the new activation attempt is compared, in the activation module, with the positions of the unsuccessful activation attempts from the or each memory per antenna, and if none of the positions of the unsuccessful activation attempts already in memory are identical to the position of the new activation attempt, with consideration to a predetermined margin of error, the position of the new activation attempt is deemed to be different, and this position is entered into the respective memory or memories.

What an aspect of the present invention seeks precisely to do is not store identical positions that could lead to inhibition through exceedance of a maximum authorized number of stored positions. The assumption confirmed by the practice underlying an aspect of the present invention is that identical positions originate from an activation means carried by an authorized person and that has failed in its activation attempt for a reason other than maliciousness. Such an activation attempt should not be counted in the intrusive activation attempts used to inhibit the activation on the basis of a predetermined number of stored unsuccessful activation attempts. The predetermined margin of error in addition to measurement errors corresponds to a movement of the activation means without movement of the person carrying it, for example to a movement of the arm of the person, the activation means still being situated within the reach of the person, who has stayed in position.

Advantageously, the comparison is performed using a calculation of a mathematical distance between the position of the new unsuccessful activation attempt and the position of each stored unsuccessful activation attempt using the following equations, with, for a single antenna:

$$\text{Distance} = MES\_memory\ 1 - MES\_new\ 1$$

or, with, for n antennas, n being greater than or equal to 1:

$$\text{Distance} = ((MES\_memory\ 1 - MES\_new\ 1)^2 + \ldots + (MES\_memory\ n - MES\_new\ n)^2)^{0.5}$$

MES_memory 1 and MES_memory n being the received signal strength indications for the memory of the first antenna and of the nth antenna, MES_new 1 and MES_new n being the received signal strength indications for the new activation attempt for the memory of the first antenna and of the nth antenna, and if the distance is less than a predetermined threshold representative of a movement of the activation means in surroundings within the reach of a person carrying the activation means without the person moving, the position of the new activation attempt is deemed to be identical and is not counted in the list or lists, whereas, if none of the positions of the unsuccessful activation attempts already in memory are identical to the new position, the new position is deemed to be different, and this position is entered into the respective memory or memories. For the last equation mentioned above, the distance is then a distance calculated using all of the positions of the unsuccessful activation attempts.

Advantageously, after a maximum number of unsuccessful activation attempts is reached, inhibition of the remote activation is performed and remains valid for a predetermined inhibition duration, and after successful activation of a function of the motor vehicle, where applicable with consideration to a delay time and/or a distance covered by the vehicle after the successful activation, at least some of the stored positions of the unsuccessful activation attempts are deleted.

This maximum number may be for example from 3 to 6. It may be lower than the one for an inhibition method according to the prior art, because the determination of unsuccessful activation attempts is more reliable in the method according to an aspect of the invention than the one from the prior art, due to the unsuccessful activation attempts triggered by an authorized person being subtracted from the stored attempts, thereby increasing the inhibition security by making the inhibition criteria more selective.

An aspect of the invention also relates to a method for remotely activating a function of a motor vehicle, the activation taking place between an activation means carried by a person authorized to perform this activation and an activation module present in the vehicle through the transmission, reception and measurement of electromagnetic waves between the activation means and the activation module, noteworthy in that it comprises such a temporary inhibition method.

The activation method is made more effective and more secure according to an aspect of the present invention with inhibitions of the activation method that are actually due to intrusive attempts and not to false detections of intrusive attempts.

BRIEF DESCRIPTION OF THE DRAWINGS

Other features, aims and advantages of aspects of the present invention will become apparent upon reading the following detailed description and with reference to the appended drawings, given by way of nonlimiting example and in which.

DETAILED DESCRIPTION OF THE PREFERRED EMBODIMENTS

A description will first of all be given of the features of a method for remotely activating a function present in a motor vehicle, these features serving to implement the inhibition method of an aspect of the present invention, but not relating specifically to the inhibition of the activation according to an aspect of the present invention.

Figure 1:
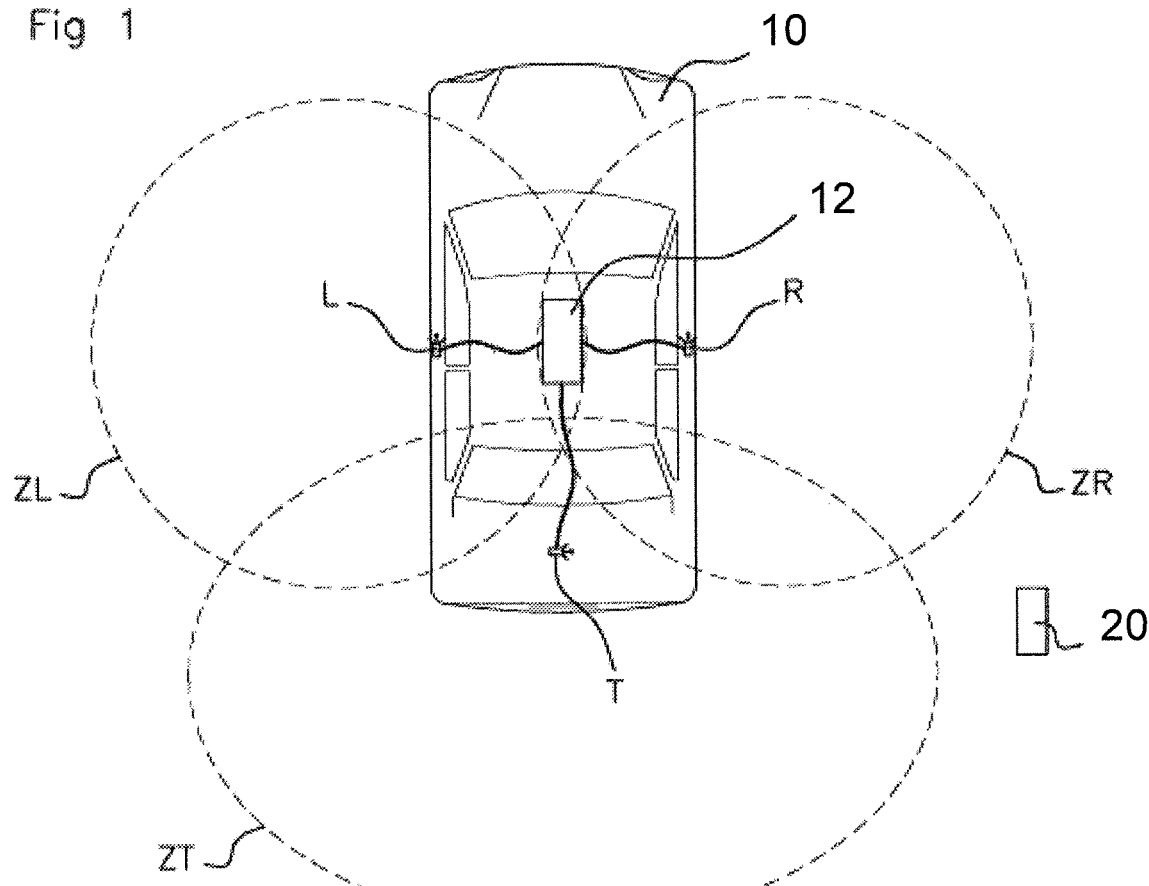
FIG. 1 is a schematic depiction of a plan view of a motor vehicle equipped with a hands-free remote activation system for activating a function present in the vehicle, the inhibition method according to an aspect of the present invention being able to apply to such a motor vehicle.

One example of a system for detecting a position of an activation means at a predetermined distance from a vehicle is illustrated in FIG. 1. Such a system is partially integrated into a vehicle 10 by an activation module 12 communicating remotely with an activation means 20 taking the form in this example of a fob for "hands-free" access to the vehicle 10.

The activation module 12 is often in the form of an electronic unit equipped with or associated with means for transmitting and receiving electromagnetic waves. In FIG. 1, without limitation, three omnidirectional antennas L, R, T coupled to the activation module 12 are provided as means for transmitting and receiving electromagnetic waves. It is possible to use one antenna or several antennas. The use of five antennas may be preferred but is likewise not limiting.

FIG. 1 shows a left lateral antenna L and a right lateral antenna R, respectively positioned in each of the front left and front right door handles, and a rear antenna T positioned in the rear zone on the rear fender or the rear trunk lock of the vehicle 10.

Under the control of the activation module 12, the antennas L, R and T transmit electromagnetic waves that induce an electromagnetic field defining a transmission zone, respectively ZL, ZR and ZT.

The activation means 20 is identified as belonging to the vehicle 10, as it is for example able to be recognized by an identifier and is configured firstly so as to detect the presence of at least one of the antennas L, R and T and to measure the total amplitude of the electromagnetic field received, originating from at least one antenna, and secondly so as to transmit the values thus measured to the activation module 12.

The function that might be involved in the activation may be the closing and/or the opening of an opening element, for example a door or the trunk of the vehicle. The function may also be the starting of the vehicle 10. The authorized person carrying the activation means 20 may be situated outside or inside the motor vehicle 10 when the activation is triggered, this depending on the function to be activated.

To control the activation, a fixed position of the activation means 20 may be detected, or the activation means 20 may follow a predetermined course by undergoing a plurality of detections.

The activation module 12 is able to recognize the activation means 20, to determine a mathematical position in an electromagnetic field space of the activation means for a predetermined detection zone, and to authorize the activation in this case.

As mentioned above, there is associated, with this remote activation system, an inhibition system implementing an inhibition method that is performed after a predetermined number of unsuccessful activation attempts.

In the prior art, a distinction is not drawn between malicious attempts and activation attempts that are unsuccessful but that have been performed by a person authorized to make them, these attempts having been unsuccessful for various reasons, such as being outside of a detection zone or subjected to noise by other electrical apparatuses, but not being malicious attempts.

According to an aspect of the invention, the respective mathematical positions of the unsuccessful activation attempts are stored, and only activation attempts whose position differs by a certain threshold from at least one position of an already stored unsuccessful activation attempt are taken into account as unsuccessful activation attempts.

An aspect of the invention takes into account that a specific feature of an unsuccessful activation attempt performed by an authorized person is performed at the same location, the authorized person not moving but attempting to find the best operating position for his activation means 20 by picking it up and moving it with his hand. This means that the movement of the activation means 20 is small, and is performed around the position of the authorized person and within arm's reach of this person.

In contrast thereto, an activation attempt by a criminal involves significant movement of an apparatus acting as activation means 20 and therefore a sequence of activation attempts at various locations. An aspect of the invention therefore makes it possible to focus the decision to inhibit the activation on unsuccessful activation attempts that differ from one another in terms of their positions, and not to include attempts in similar positions, which result more from an authorized person than from a criminal, in the unsuccessful attempts.

Figure 2:
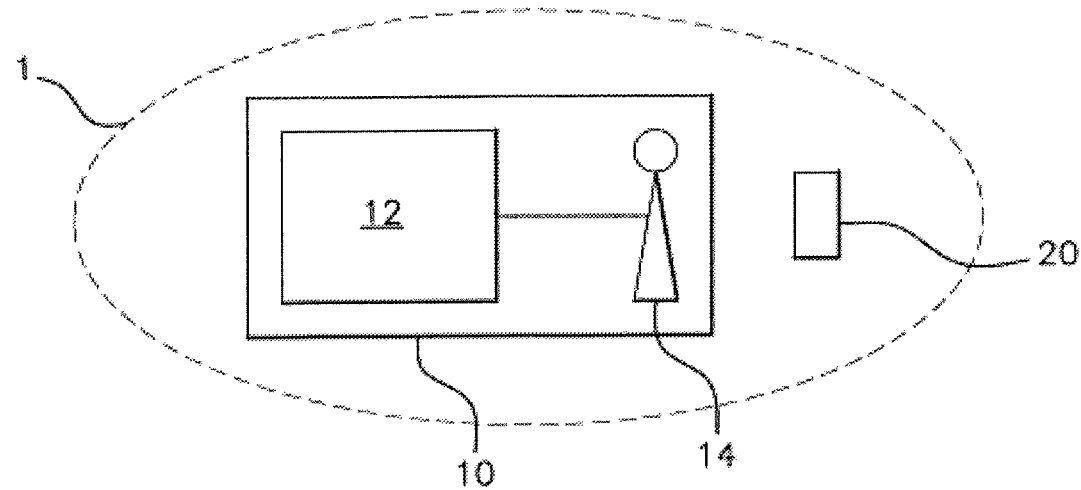
FIG. 2 is a schematic depiction of a hands-free remote activation system for activating a function present in a motor vehicle, the inhibition method according to an aspect of the present invention being able to apply to such a hands-free activation system.

With reference to FIG. 2, which shows the details of a remote activation system 1, a vehicle 10 comprises a remote activation module 12 for activating a function provided in the vehicle 10. The activation system includes at least one omnidirectional antenna 14 mounted on the vehicle 10 and not only at the rear part of the vehicle. This antenna 14 is coupled to said activation module 12 and configured firstly so as to transmit, preferably periodically, electromagnetic waves that induce an electromagnetic field in an electromagnetic transmission space 1 around the vehicle 10, and secondly so as to receive electromagnetic waves from the activation means 20.

Although a single antenna 14 is shown in FIG. 2, the system may be equipped with a plurality of antennas. As the following text relates to FIG. 2, only one antenna is mentioned, but the description may be applied to each antenna of an activation system comprising a plurality of antennas. There may also be a plurality of antennas with a main antenna that communicates with the activation module 12.

As was shown in FIG. 1, when the activation module is associated with a plurality of antennas, the antennas may be positioned at various locations of the vehicle, the antennas or groups of antennas being able to transmit electromagnetic waves alternately.

The electromagnetic waves transmitted by the antenna 14 or each antenna may comprise information grouped into what is known as a "detection" frame, in particular containing an identification code of the vehicle 10 or information grouped into what is known as a "measurement request" frame, containing a request intended for an activation means 20 associated with the vehicle 10 in order for this activation means 20 to measure the components of the magnetic field induced by the electromagnetic waves transmitted by the antenna 14 or each antenna. The electromagnetic field induced by the waves transmitted by the antenna 14 or each antenna may be quantified at any point of the transmission space.

In one preferred embodiment, the activation module 12 comprises or is linked to a computer configured so as to determine the mathematical position in an electromagnetic field space of the activation means 20. The activation means 20 may first of all be configured so as to transmit electromagnetic waves containing information grouped into what is known as a "wake-up" frame intended for the antenna 14 or each antenna and comprising in particular an identification code of the activation means 20.

Advantageously, the activation module 12 may send, via the antenna 14 or the antennas, low-frequency waves, for example at around 125 kHz, and the activation means may respond with radiofrequency waves, for example at 433 MHz or 315 MHz, but this is not limiting.

The activation means 20 is furthermore configured so as to transmit, preferably periodically, electromagnetic waves containing information grouped into what is known as a "measurement" frame, intended for the antenna 14 and comprising a set of values of the spatial components of the electromagnetic field that are measured by the activation means 20 at a point of the transmission space of the antenna 14.

The activation means 20 is also configured so as to send, preferably periodically, these measurement frames to the activation module 12. To this end, the activation means 20 comprises transmission means of antenna type. The activation means 20 preferably takes the form of a fob or an electronic key, without this being limiting to the scope of an aspect of the present invention.

To detect a fixed position of an activation means 20, the activation module 12 of the vehicle 10 may first of all transmit periodically, for example every 300 to 500 ms, electromagnetic waves that may contain a detection frame into an electromagnetic transmission space via its antenna 14 or each antenna.

When an activation means 20 associated with the vehicle 10 enters said transmission space and receives at least one of the detection frames transmitted by the antenna 14, it is able to determine, for example using an identification code of the vehicle 10, that it is in the transmission space of an antenna 14 or of the antennas coupled to an activation module 12 with which it is remotely associated.

The activation means 20 then for its part sends electromagnetic waves containing a frame, known as a wake-up frame, to the activation module 12 via the antenna 14 or at least one of the antennas serving as main antenna.

The activation module 12 analyzes the received wake-up frame and determines, on the basis of the identification code of the activation means 20 that it contains, that this frame has been sent by an activation means 20 that is associated therewith.

After doing this, the activation module 12 sends, still via the antenna 14 or each antenna, electromagnetic waves containing a measurement request frame to the activation means 20.

When it receives the measurement request frame, the activation means 20 will then measure, preferably periodically, for a predetermined detection time interval, a signal strength indication of the received electromagnetic waves that have been transmitted by the antenna 14 or each antenna associated with the activation module 12, and sends the measurements to the activation module 12.

The detections may take place periodically, and the electromagnetic waves may be sent in an offset manner by the antenna 14 or each antenna associated with the activation module 12.

The activation module 12 is able to determine a mathematical position in an electromagnetic field space of the activation means 20 for a detection zone, and authorize the activation in this case. In the opposite case, the activation attempt in relation to this position is considered to be unsuccessful and is placed in a list of unsuccessful activation attempts, the activation being inhibited after a predetermined number of unsuccessful activation attempts.

According to an aspect of the invention, for a new unsuccessful activation attempt, when its mathematical position is close to another of the stored unsuccessful activation attempts, the activation module 12 does not store this new attempt as an unsuccessful attempt, and this new attempt does not influence the inhibition of the activation method.

Close means that the activation means has not undergone movement or only a slight movement in comparison with the position of a stored attempt, for example resulting from a movement of an arm of a person holding the activation means 20. This suggests that the carrier of the activation means 20 has not changed position, which would not be the case for a criminal, who will without doubt move in order to look for a possible activation position that is situated in the predetermined detection zone.

Each mathematical position of the activation means may be determined by at least one received signal strength indication, received by the antenna 14 or each antenna, of an electromagnetic wave returning from the activation means. A received signal strength indication provides an indication as to the strength of a received signal serving to measure the signal. A mathematical distance of the object that transmitted this signal from the antenna may be estimated using the value of the strength. The received signal strength indication is also known under the abbreviation RSSI.

Each received signal strength indication, received from an electromagnetic wave returning from the activation means, may undergo processing so as to reduce amplitude dynamics on the basis of the distance from the activation means to the antenna or to each antenna. Specifically, the magnetic field exhibits very high amplitude dynamics depending on the distance to the antenna.

The following table gives the values of three positions of the activation means T1, T2 and T3 defined by signal strength indications MES_1, MES_2, MES_3, MES_4 and MES_5 for five different antennas. The unit nT represents nanoteslas.

| Positions of the ... activation means | MES_1 | MES_2 | MES_3 | MES_4 | MES_5 |
|---|---|---|---|---|---|
| T1 | 3 nT | 50 nT | 0 nT | 0 nT | 0 nT |
| T2 | 7 nT | 30 nT | 0 nT | 0 nT | 12 nT |
| T3 | 0 nT | 0 nT | 8 nT | 35 nT | 15 nT |

The unsuccessful attempts to remotely activate the vehicle are grouped into at least one software memory integrated into the activation module, the antenna or each antenna having a respective software memory, if these activation attempts are not close to one another. There is a maximum number of activation attempts in each memory which, once it is exceeded, causes the activation method to be inhibited. For a number of antennas n, the memory or memories contain the n signal strength indications of the position of each unsuccessful activation attempt T1 to T3. For a system with five antennas, for example, there will be five measurements for each position. If there are a plurality of similar activation means for the same vehicle, the software memory or memories will advantageously be duplicated.

For a new unsuccessful activation attempt, the position of the new activation attempt is compared, in the activation module, with the positions of the unsuccessful activation attempts from the or from each memory per antenna. If none of the unsuccessful activation positions already in memory are identical to the position of the new activation attempt, with consideration to a predetermined margin of error, the position of the new activation attempt is deemed to be different, and this position is entered into the respective memory or memories.

By contrast, if a new position of an unsuccessful activation attempt is substantially identical to an already stored position, this new position is not stored as it is considered to relate to an activation attempt made by an authorized person having a compliant activation means, and therefore not threatening the security of the system.

The position of the activation means, not being known in the form of a physical position, is in fact stored in the form of n signal strength indications, n being the number of antennas, which correspond to this position. The signal strength indications originate from the measured fields for each transmitter antenna of the system. A variation in these n indications will be interpreted as a position variation.

Two non-limiting examples of a mode for calculating the distance between a position of a new unsuccessful activation attempt and the positions of the stored activation attempts in the context of the inhibition method according to an aspect of the present invention will now be given.

For a single antenna, it is possible to perform a comparison using a calculation of a mathematical distance between the new unsuccessful activation attempt and each stored unsuccessful activation attempt using the following equations, with, for a single antenna:

$$\text{Distance} = MES\_\text{memory } 1 - MES\_\text{new } 1$$

MES_memory 1 being the received signal strength indication for the memory of the single antenna and MES_new 1 the received signal strength indication for the new activation attempt.

As an alternative, for n antennas, it is possible to perform a comparison for each position of a stored unsuccessful activation attempt using the following equation:

$$\text{Distance} = ((MES\_\text{memory } 1 - MES\_\text{new } 1)^2 + \ldots + (MES\_\text{memory } n - MES\_\text{new } n)^2)^{0.5}$$

MES_memory 1 and MES_memory n being the received signal strength indications for the memory of the first antenna 14 and of the nth antenna, MES_new 1 and MES_new n being the received signal strength indications for the new activation attempt for the memory of the first antenna 14 and of the nth antenna.

In both cases, if the distance is less than a predetermined threshold representative of a movement of the activation means in surroundings within the reach of a person carrying the activation means without the person moving, the position of the new activation attempt is deemed to be identical and is not counted in the list or lists.

By contrast, if none of the positions of the unsuccessful activation attempts already in memory are identical to the new position, the new position is deemed to be different, and this position is entered into the respective memory or memories.

After a maximum number of unsuccessful activation attempts is reached, inhibition of the remote activation is performed and remains valid for a predetermined inhibition duration. This represents security, in the knowledge that all of the unsuccessful activation attempts are probably malicious activation attempts, the other unsuccessful activation attempts having been subtracted from the stored unsuccessful attempts. This temporary inhibition may be for example one hour without a new request to activate the function present in the vehicle, for example starting.

After successful activation of a function of the motor vehicle, where applicable with consideration to a delay time and/or a distance covered by the vehicle after the successful activation, at least some of the stored positions of the unsuccessful activation attempts are deleted.

For example, without limitation and remaining within the judgement of the driver or the motor vehicle manufacturer, the delay time may be 1 minute and/or the distance covered may be 1 km for all of the memories of the available activation means to be cleared of one or more of their oldest unsuccessful activation attempt positions.

An aspect of the invention also relates to a method for remotely activating a function of a motor vehicle, the activation taking place between an activation means carried by a person authorized to perform this activation and an activation module present in the vehicle through the transmission, reception and measurement of electromagnetic waves between the activation means and the activation module. According to an aspect of the invention, the activation method comprises a temporary inhibition method as described above.

Such an activation method exhibits less risk of being incorrectly locked, whereas it exhibits at least the same security with regard to the detection of malicious attempts as the method from the prior art.

The invention claimed is:

1. A method for temporarily inhibiting remote activation of a function present in a motor vehicle, the remote activation taking place between an activation means carried by a person authorized to perform the remote activation and an activation module present in the vehicle through the transmission, reception and measurement of electromagnetic waves between the activation means and the activation module, the activation module being able to recognize the activation means, to determine a mathematical position in an electromagnetic field space of the activation means for a detection zone and to authorize the activation in this case, the activation being inhibited after a predetermined number of activation attempts that are unsuccessful as they are considered to be located outside of the detection zone, wherein the respective mathematical positions of the unsuccessful activation attempts are stored and that only activation attempts whose position differs by a certain threshold from at least one position of an already stored unsuccessful activation attempt are taken into account as unsuccessful activation attempts.

2. The method as claimed in claim 1, wherein the activation module is associated with at least one antenna for transmitting and receiving electromagnetic waves and that is situated on or in the motor vehicle.

3. The method as claimed in claim 2, wherein, when the activation module is associated with a plurality of antennas, the antennas are positioned at various locations of the vehicle, the antennas or groups of antennas transmitting electromagnetic waves alternately.

4. The method as claimed in claim 2, wherein each mathematical position of the activation means is determined by at least one received signal strength indication, received by the antenna or each antenna, of an electromagnetic wave returning from the activation means.

5. The method as claimed in claim 4, wherein each received signal strength indication, received from the electromagnetic wave returning from the activation means, undergoes processing so as to reduce amplitude dynamics on the basis of the distance from the activation means to the antenna or to each antenna.

6. The method as claimed claim 4, wherein the stored unsuccessful attempts to remotely activate the vehicle are grouped into at least one software memory integrated into the activation module, the antenna or each antenna having a respective software memory.

7. The method as claimed in claim 6, wherein, for a new unsuccessful activation attempt, the position of the new activation attempt is compared, in the activation module, with the positions of the unsuccessful activation attempts from the or from each memory per antenna, and if none of the positions of the unsuccessful activation attempts already in memory are identical to the position of the new activation attempt, with consideration to a predetermined margin of error, the position of the new activation attempt is deemed to be different, and this position is entered into the respective memory or memories.

8. The method as claimed in claim 7, wherein the comparison is performed using a calculation of a mathematical distance between the position of the new unsuccessful activation attempt and the position of each stored unsuccessful activation attempt using the following equations, with, for a single antenna:

$$\text{Distance} = MES\_\text{memory } 1 - MES\_\text{new } 1$$

or, with, for n antennas, n being greater than or equal to 1:

$$\text{Distance} = ((MES\_\text{memory } 1 - MES\_\text{new } 1)^2 + \ldots + (MES\_\text{memory } n - MES\_\text{new } n)^2)^{0.5}$$

MES_memory 1 and MES_memory n being the received signal strength indications for the memory of the first antenna and of the nth antenna, MES_new 1 and MES_new n being the received signal strength indications for the new activation attempt for the memory of the first antenna and of the nth antenna, and if the distance is less than a predetermined threshold representative of a movement of the activation means in surroundings within the reach of a person carrying the activation means without the person moving, the position of the new activation attempt is deemed to be identical and is not counted in the list or lists, whereas, if none of the positions of the unsuccessful activation attempts already in memory are identical to the new position, the new position is deemed to be different, and this position is entered into the respective memory or memories.

9. The method as claimed in claim 8, wherein, after a maximum number of unsuccessful activation attempts is reached, inhibition of the remote activation is performed and remains valid for a predetermined inhibition duration, and in that, after successful activation of a function of the motor vehicle, where applicable with consideration to a delay time and/or a distance covered by the vehicle after the successful activation, at least some of the stored positions of the unsuccessful activation attempts are deleted.

10. A method for remotely activating a function of a motor vehicle, the activation taking place between an activation means carried by a person authorized to perform this activation and an activation module present in the vehicle through the transmission, reception and measurement of electromagnetic waves between the activation means and the activation module, comprising a temporary inhibition method as claimed in claim 1.

11. The method as claimed in claim 3, wherein each mathematical position of the activation means is determined by at least one received signal strength indication, received by the antenna or each antenna, of an electromagnetic wave returning from the activation means.

12. The method as claimed in claim 5, wherein the stored unsuccessful attempts to remotely activate the vehicle are grouped into at least one software memory integrated into the activation module, the antenna or each antenna having a respective software memory.

13. The method as claimed in claim 7, wherein, after a maximum number of unsuccessful activation attempts is reached, inhibition of the remote activation is performed and remains valid for a predetermined inhibition duration, and in that, after successful activation of a function of the motor vehicle, where applicable with consideration to a delay time and/or a distance covered by the vehicle after the successful activation, at least some of the stored positions of the unsuccessful activation attempts are deleted.

* * * * *

UNITED STATES PATENT AND TRADEMARK OFFICE
CERTIFICATE OF CORRECTION

PATENT NO. : 10,640,088 B2
APPLICATION NO. : 16/481880
DATED : May 5, 2020
INVENTOR(S) : Alain Brillon and Stéphane Charbonnier Page 1 of 1

It is certified that error appears in the above-identified patent and that said Letters Patent is hereby corrected as shown below:

In the Specification

At Column 10, Line 9, delete "..attempts from the or from each memory per antenna." and insert --attempts from the memory of the antenna or from each memory per antenna--.

In the Claims

At Column 12, Claim 7, Line 19, delete "from the or from each memory per antenna," and insert --from the memory of the antenna or from each memory per antenna,--.

Signed and Sealed this
First Day of September, 2020

Andrei Iancu
*Director of the United States Patent and Trademark Office*